United States Patent [19]
Fulton et al.

[11] Patent Number: 5,433,344
[45] Date of Patent: Jul. 18, 1995

[54] CONTINUOUS FEED, CHEMICAL SWITCHING UNIT

[75] Inventors: Steven Fulton, Arlington; Lyle T. Orthman, Mesquite; Eric R. Snodgrass, Arlington, all of Tex.

[73] Assignee: National Semiconductor Corporation, Santa Clara, Calif.

[21] Appl. No.: 241,162

[22] Filed: May 10, 1994

Related U.S. Application Data

[62] Division of Ser. No. 934,936, Aug. 24, 1992, Pat. No. 5,310,087.

[51] Int. Cl.⁶ .............................. B67D 5/08
[52] U.S. Cl. ............................ 222/65; 222/144.5
[58] Field of Search ............. 222/14, 16, 51, 53, 222/64-67, 639, 145, 129, 144.5; 137/113, 563, 559, 93, 413, 205; 141/165; 118/694

[56] References Cited

U.S. PATENT DOCUMENTS

| | | | |
|---|---|---|---|
| 3,810,778 | 5/1974 | Wang | 117/34 |
| 3,878,970 | 4/1975 | Nezorski | 222/61 |
| 3,960,295 | 6/1976 | Hovak | 137/392 X |
| 4,247,018 | 1/1981 | Credle | 137/113 X |
| 4,377,246 | 3/1983 | McMillin et al. | 222/67 X |
| 4,406,247 | 9/1983 | Baughman et al. | 222/65 X |
| 4,601,409 | 7/1986 | DiRegolo | 222/67 X |
| 4,637,341 | 1/1987 | Switall | 118/694 |
| 4,676,404 | 6/1987 | Yamazaki et al. | 222/66 X |
| 5,040,564 | 8/1991 | Auvoja | 137/113 |
| 5,129,415 | 7/1992 | Runyon et al. | 137/113 |
| 5,156,298 | 10/1992 | LaRue | 222/66 |

FOREIGN PATENT DOCUMENTS 235437  9/1987  European Pat. Off. ............ 222/66

*Primary Examiner*—Andres Kashnikow
*Assistant Examiner*—Kenneth R. DeRosa
*Attorney, Agent, or Firm*—Jacques M. Dulin

[57] ABSTRACT

Continuous feed, chemical switching unit for supplying an uninterrupted flow of chemical fluid to a processing system including a control unit and a reservoir for containing a predetermined volume of chemical fluid wherein the reservoir is in hydraulic communication with a processing system. A plurality of float level sensors are provided within the reservoir for locating the fluid level in the reservoir wherein at least one level sensor provides an interlock to the processing system when energized to halt the processing system operation, and the other level sensors communicate reservoir level information to the control unit. The switching unit also includes a plurality of replaceable chemical fluid bottles for storing the fluid, e.g. a first active bottle and a second standby bottle, wherein the bottles are in independent hydraulic communication with the reservoir. Each fluid bottle has associated therewith an inert-gas actuated isolation valve for isolating the bottle from the reservoir. A vacuum source is in hydraulic communication with and for drawing a vacuum on the reservoir to cause fluid flow from an active bottle including an inert-gas actuated isolation valve associated therewith for isolating the vacuum source from the reservoir. The control unit is responsive to electrical signals from the level sensors, to an input power signal, and to a plurality of user commands, and is operative to generate signals to actuate the vacuum source isolation valve and the bottle isolation valves to switch the source of chemical fluid flow from one bottle to another as the first bottle becomes empty. Finally, an explosion-proof enclosure for housing the switching unit components wherein the enclosure is fitted with an exhaust device to vent explosive gases from the enclosure and is also equipped with a fire extinguishing device.

7 Claims, 7 Drawing Sheets a typical chemical system, prevalent in the prior art,

CONTINUOUS FEED, CHEMICAL SWITCHING UNIT

This is a divisional of application Ser. No. 07/934,936, filed on Aug. 24, 1992, now U.S. Pat. No. 5,310,087, issued May. 10, 1994.

FIELD

The present invention relates generally to feed chemical devices and more particularly to continuous feed, chemical devices for supplying photo-resist spin-coating systems used in integrated circuit (IC) wafer fabrication.

BACKGROUND

In the wafer fabrication process, after the initial preparatory steps of cleaning and dehydration baking, the wafers undergo a coating step. Wafer coating usually involves the application of two chemicals to the wafer including an adhesion-promoter such as hexamethyldisilizane (HMDS) and a photoresist chemical. After the HMDS is applied to the wafer, the wafer is spun (typically within a track system) to produce a uniform coating. After the wafer is dry, the photoresist chemical is applied to the wafer where it is then spun again to produce a uniform coating.

The coating chemicals, due to their volatile nature, are contained in closed containers. It is known in the art to provide a simple fluid delivery system which typically consists of a pumping unit and associated inlet and outlet lines. The pump draws the chemical fluid from the container or canister and delivers the chemical to the coating apparatus where it is then deposited on the wafer.

A typical chemical system, prevalent in the prior art, is schematically illustrated in FIG. 1. A feed chemical system 100 includes a fluid chemical 102, used in some processing operation (typically IC wafer fabrication), a storage tank or container 103 for holding the fluid 102, a processing system 104 for performing the processing operation and ultimately consuming the fluid, and a pumping system 106 for delivering the fluid 102 from the storage tank 103 to the processing system 104. The pumping system 106 is communicatively coupled, via a suction pipe 108, with the storage tank 103, and a discharge pipe 109 communicatively couples the pumping system 106 with the processing system 104.

In operation, the pumping system 106 draws the fluid 102 from the tank 103 via the suction pipe 108, and pumps the fluid 102 via the discharge pipe 109 to the processing system 104. The pumping system continues to draw on the tank until the level of fluid contained in the tank reaches a predetermined level. When the fluid level in the tank reaches this level, the tank is considered "empty" and the process operation must be halted, the pump shut down and the tank either refilled, or removed and replaced.

A problem with the prior art feed chemical delivery systems is that when the fluid supply canister runs dry, chemical fluid flow is interrupted, resulting in miscoating since the pumping or processing operations are not halted immediately. In the wafer coating process operation, for example, when the chemical fluid (i.e., photoresist material) is depleted from the storage container, the coating applicator continues to operate for a time until the situation is noticed. During this time the applicator continues to feed on the wafer surface without dispensing any photo-resist material thereby leaving bare, or irregularly or insufficiently coated areas on the surface of the wafer. The unacceptable quality of the coatings deposited on the affected wafers results in scrapping of these units, thereby increasing costs and reducing production yields. In addition, when the chemical fluid is depleted, the processing system must be halted while the storage container is either replaced by a full container or replenished with more chemical fluid. Misprocessings also occur frequently when the process system is restarted after such an interruption.

Yet another problem caused by interruption of the chemical fluid flow is slowdown in the overall manufacturing throughput. As the chemical fluid flow is depleted, the processing system must be shut down and the throughput halted. Even if the processing and pumping systems are shut down at the appropriate time and the manufacturing quality is not impaired, the production line is nevertheless halted while the chemical fluid is replenished. Clearly, as chemical fluid flow interruptions become more frequent the throughput of units processed by the particular processing system is significantly reduced.

Yet another problem found in prior art chemical feed systems is the excessive consumption of chemical fluids. As the chemical fluids are depleted from the storage tanks and the tanks replaced or refilled, the opportunity for leakage or spillage is greatly increased.

Still another common problem found in most prior art chemical feed systems is that they are not contained within explosion-proof vented enclosures. The storage tanks, for example, are frequently left in the open on the facility floor. This lack of self-containment creates two other problems. First, a greater amount of facility floor space is devoted to components of the feed chemical system. Second, the potential for explosion or fire is increased. The chemical fluid is flammable and must be contained in a properly vented explosion-proof enclosure. When the tanks are left in the open, proper precautions to ensure adequate ventilation may be overloaded. Also, the storage tanks are not likely to be contained within an explosion-proof container. Furthermore, the appropriate fire prevention equipment may not be installed proximate to the storage tanks. These also lead to regulatory violations and fines, as well as increased insurance liability costs.

Accordingly, there is a definite need in the art for a continuous feed chemical system which overcomes the problems of the prior art.

SUMMARY

The present invention comprises a continuous feed, chemical switching unit for controlling the chemical delivery from two or more chemical storage canisters or bottles and which automatically switches over to a full bottle upon detection of an empty bottle. The system further includes a plural container reservoir for containing a predetermined volume of a chemical fluid. The reservoir is in fluid communication with a provided processing system. The reservoir is provided with plurality of level sensors for monitoring the fluid level in the reservoir wherein at least one level sensor is in electronic communication with the provided processing system whereby if the level sensor is energized then the operation of the processing system is halted, and the other level sensors communicate reservoir level information to a control unit. A plurality of chemical fluid containers for storing the fluid are provided wherein the containers are in independent fluid communication with the reservoir. Inert-gas actuated isolation valves are provided for isolating the fluid containers from the reservoir. A vacuum source is provided for drawing a vacuum on the reservoir. The vacuum source is controlled via an inert-gas actuated isolation valve for isolation from the reservoir. The control unit is responsive to electrical signals from the level sensors, an input power signal, and a plurality of user commands, and is operative to generate signals to actuate the vacuum source isolation valve and the container isolation valves whereby the container isolation valves are positioned so as to alternate chemical fluid flow from one container then another. Finally, an explosion-proof enclosure is provided for housing the components of preferred embodiment of the present invention, wherein the enclosure is fitted with an exhaust device to vent explosive gases from the enclosure and is also equipped with a fire extinguishing device.

An advantage of the present invention is that it supplies a continuous and non-interrupted flow of chemical feed thereby obviating the misprocessing, excessive consumption and waste, and reduced throughput problems found in prior art systems. The plurality of chemical fluid containers allows at least one full fluid container to always be on "full standby" while the other container is "on-line" supplying the processing system. When the "on-line" container is depleted, the control unit places the "full standby" container to an "on-line" state while placing the previously "on-line" container into an "empty standby" state, thereby allowing the empty container to be replenished or replaced with "full standby" container.

Another advantage of the present invention is that it is interlocked with the processing system. In the event of a system anomaly, the processing system will be shut down and no misprocessing or waste of chemical fluid will occur.

Yet another advantage of the present invention is that the level sensors are interlocked with an alarm or another active device that can be remotely or locally situated. If a system anomaly occurs or all the containers are depleted, operators of the chemical feed system can be warned and appropriate action taken. Alternately, the signals from the level sensors can be used to actuate an automatic device that can replenish the chemical fluid or resolve the anomaly.

Still another advantage of the present invention is that it is self-contained. When packaged into an enclosure, the components take up less facility floor space and the fire prevention devices and exhaust system can be efficiently installed to service the entire continuous feed chemical system rather than distributed over a wide spread area.

These and the other advantages of the present invention will no doubt become apparent to those skilled in the art after having read the following detailed description of the preferred embodiment illustrated in the several figures of the drawing.

DRAWINGS

DETAILED DESCRIPTION OF THE BEST MODE

Figure 2:
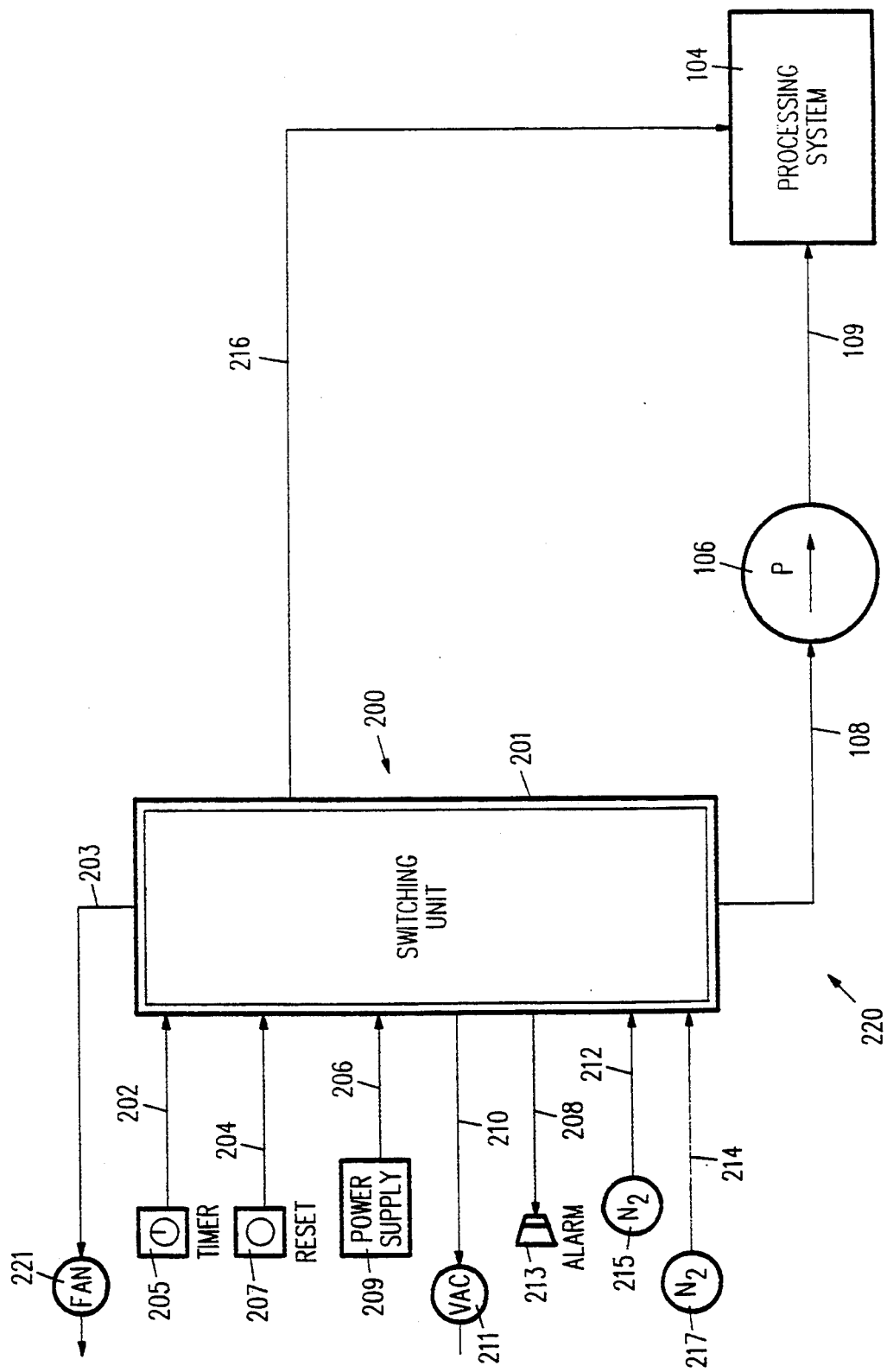
FIG. 2 is a block diagram schematically depicting a continuous feed chemical delivery system of the present invention.

A continuous feed chemical delivery system 220 is schematically depicted in FIG. 2. The system 220 includes a switching unit 200, contained within a cabinet 201, wherein the unit 200 is in fluid communication with a typical prior art processing system 104. The pumping system 106 delivers a chemical fluid (not shown) from the unit 200 to the photoresist processing system 104. The pumping system 106 draws the fluid from the unit 200 via a suction pipe 108, and discharges the fluid to the processing system 104 via a discharge pipe 109.

A preferred embodiment of the switching unit 200 is used for servicing and supporting an IC wafer fabrication process. More particularly, the unit 200 is used to store photo-resist material and support a photo-resist spin-coating processing system that is used for IC wafer fabrication. However, it is understood that implementation of the unit 200 is not limited to supporting only this particular process and the switching unit may be used for supporting a variety of other processes including but not limited to use in combination with an acid developer, an acid processor, or use in a variety of bulk refill process operations. Similarly, the switching unit may be used to control the continuous feed of a wide variety of fluids or chemicals.

The switching unit 200 is also communicatively coupled with the processing system 104 via a process interlock signal line 216. When a system anomaly occurs such as, for example, where both chemical supply bottles are empty or the system malfunctions, the anomaly condition is communicated to the processing system 104 via signal line 216.

The switching unit 200 has several other input and output interfaces. The unit 200 is communicatively coupled with a time set device ("Timer") 205, a reset device ("Reset") 207, a power supply device ("Power Supply") 209, a vacuum source 211, an alarm 213, and a plurality of inert gas storage containers 215, 217.

The time set device 205 provides a variable time base adjustment to accommodate a variety of fluid viscosities that are handled by the switching unit 200. The device 205 is in electronic communication with the switching unit 200 via a time set signal line 202. The device 205, can be located at a either a local or a remote site with respect to the switching unit 200. In the preferred embodiment illustrated in FIG. 2, the time set device 205 is located at a site remote to the switching unit 200.

After an alarm condition has been investigated and corrected, the reset device 207 is used to clear an alarm condition and reset the electronic components of unit 200. The device 207 is in electronic communication with the switching unit 200 via a reset signal line 204. The reset device 207 can be located at a either a local or a remote site (as illustrated in FIG. 2) with respect to the switching unit 200. However, in the preferred embodiment illustrated in FIG. 2, the reset device 207 is located at a site remote to the switching unit 200.

Another input device is a power supply device 209 which is in electronic communication with the switching unit 200 via a power supply signal line 206. The power supply device 209 provides 12 volt DC power for a switching unit controller (described in detail below with reference to FIG. 3).

An output device is an alarm 213 which is in electronic communication with the switching unit 200 via an alarm signal line 208. The alarm 213 provides an audible or visual alarm when a system anomaly condition has occurred or the switching unit 200 requires servicing. The alarm device 213 can be located at a either a local or a remote site (as illustrated in FIG. 2) with respect to the switching unit 200. In the preferred embodiment illustrated in FIG. 2, the alarm device 213 is located at a site remote from the switching unit 200.

An external vacuum source 211 is communicatively coupled to the switching unit 200 via a vacuum output pipe 210. The vacuum source draws a vacuum on some chemical fluid containing components included within the switching unit 200.

The switching unit 200 is also communicatively coupled to a plurality of inert gas storage containers 215 and 217. As is shown in the drawings, a preferred inert gas is nitrogen ($N_2$). Each storage container provides inert gas to the switching unit 200 and is in independent fluid communication with the unit 200. Thus, container 215 is in fluid communication with the switching unit 200 via a bottle #2 inert gas supply pipe 212; container 217 is in fluid communication with the switching unit 200 via a bottle #1 inert gas supply pipe 214. It should be noted that although only two inert gas storage containers have been shown in FIG. 2, any number of storage containers could have been illustrated with only minor modification to the present embodiment.

Finally, the switching unit cabinet 201 is communicatively coupled with an exhaust fan 221, via a cabinet exhaust pipe 203. The exhaust fan 221 vents the switching unit cabinet 201 exhausting flammable gases from the cabinet 201 thereby preventing explosions and fires.

Figure 3:
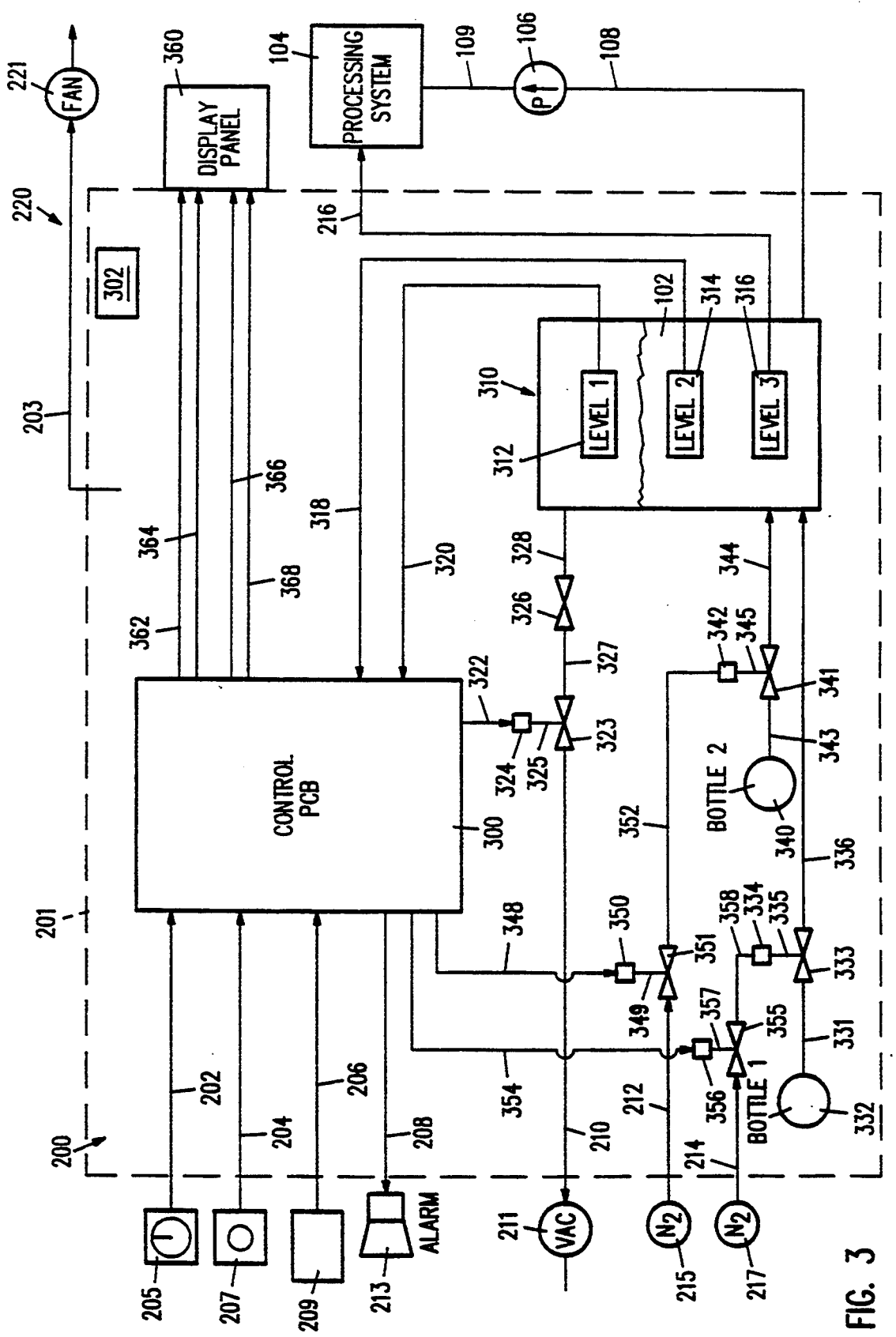
FIG. 3 is a schematic block diagram illustrating the preferred embodiment of a switching unit (i.e. item 200 of FIG. 2).

The switching unit 200 is schematically depicted in FIG. 3. It is contained within the cabinet 201, and includes the following components: a printed circuit board 300 containing control logic (hereinafter "control PCB 300"), a reservoir 310, a first fluid chemical bottle 332 (Bottle 1), a second fluid chemical bottle 340 (Bottle 2), and a plurality of valves. While only two chemical fluid bottles, or containers, have been illustrated in the preferred embodiment, it will be appreciated by those skilled in the art that any greater number of fluid bottles may be installed into the switching unit as desired without sacrificing its operational capability or efficiency. Also provided to the cabinet is a fire extinguisher device designated generally as 302. The self-contained fire extinguishing device 302 operates in the known way and is preferably activated at a preselected threshold temperature.

Figure 1:
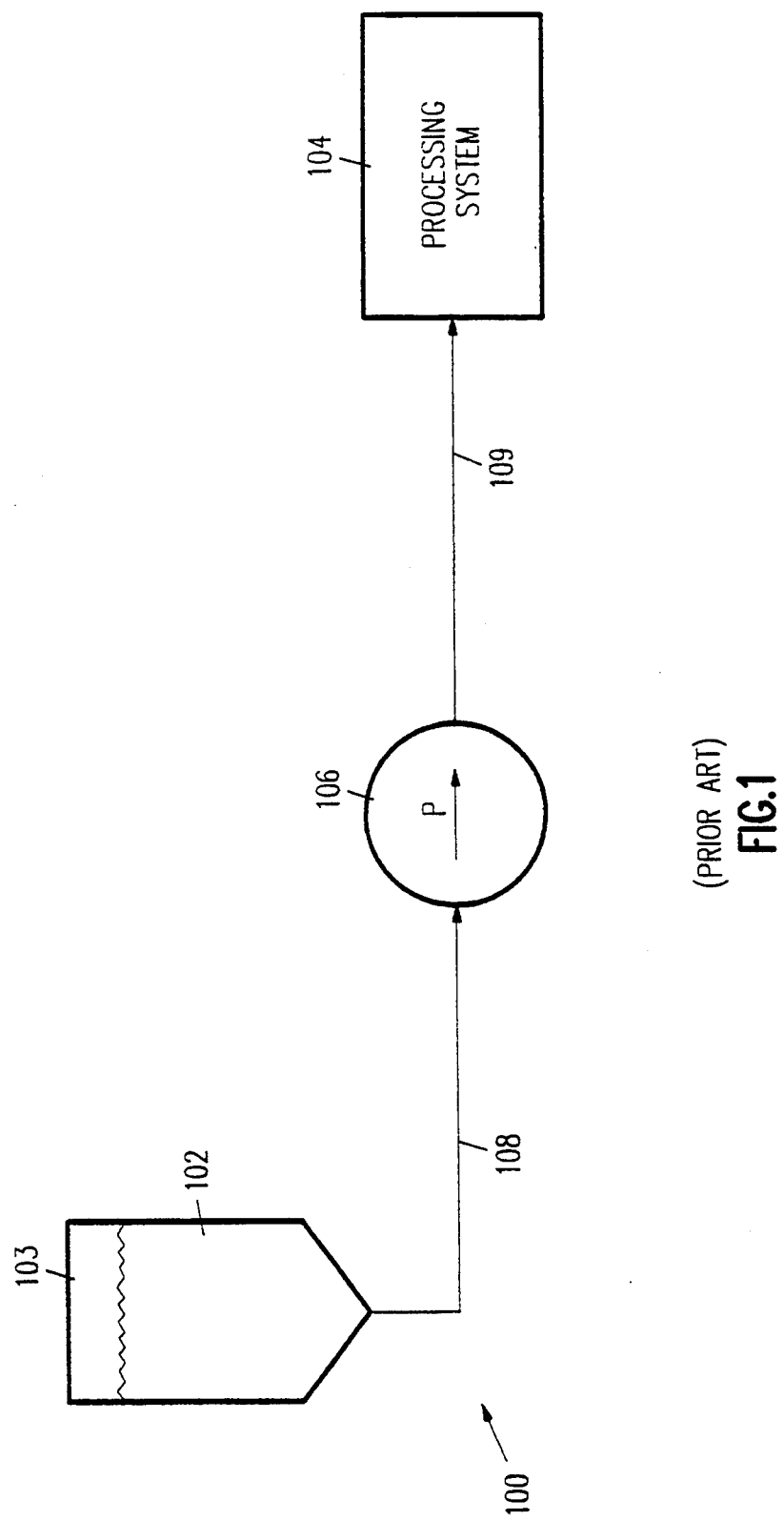
FIG. 1 is a block diagram schematically illustrating a typical prior art feed chemical delivery system.

The reservoir 310 contains a quantity of chemical fluid 102 and is in fluid communication with the process system 104 (FIG. 1), with the containers 332 and 340, and with the vacuum source 211 (FIG. 2). The pumping system 106 draws fluid 102, via pipeline 108, from the reservoir and discharges fluid 102, via pipeline 109, to the process system 104. The vacuum source 211 draws a vacuum on the reservoir 310 via the vacuum outlet pipe 210, a vacuum source pipe 327 and 328. The vacuum source 211 can be isolated from the reservoir 310, by either a vacuum source manual isolation valve 326 or a vacuum source isolation valve 323. The reservoir 310 is also in fluid communication with bottle #1, item 332, via a chemical fluid pipe 331 and 336. In addition, the reservoir 310 is in fluid communication with bottle #2, item 340, via a chemical fluid pipe 343 and 344. Thus, when the reservoir 310 is under a vacuum, the fluid 102 stored in bottle 332 (or 340) flows to the reservoir via pipes 336 and 331 (or 343 and 344), unless a bottle #1 isolation valve 333 (or bottle #2 isolation valve 341) is closed.

The bottle #1 isolation valve 333 is a gas actuated solenoid valve and includes a bottle #1 isolation solenoid 334 and an actuation rod 335. Similarly, the bottle 2 isolation valve 341 includes a bottle #2 isolation solenoid 342 and an actuation rod 345. The solenoid 334 is in fluid communication with the inert gas storage container 217 via an inert gas supply pipe 358 and the bottle 1 inert gas supply pipe 214. The solenoid 334 is isolated from the container 217 by an inert gas isolation valve 355. In similar fashion, the solenoid 342 is in fluid communication with the inert gas storage container 215 (FIG. 2), via an inert gas supply pipe 352 and the container 2 inert gas supply pipe 212. The solenoid 342 is isolated from the container 215 by an inert gas isolation valve 351.

Included within the reservoir 310 is a magnetically activated Hall-effect sensor float array consisting of three sensors, for determining the level of chemical fluid 102 in the reservoir 310. An empty-level (or process interlock) sensor 316 is installed at the lowest in the reservoir 310, and is in electronic communication with the processing system 104 via the signal line 216. A fill-level sensor 314 is situated at an intermediate or center level and is in electronic communication with the control PCB 300, via a fill-level sensor signal line 318. A full-level sensor 312 is mounted at the highest level of all three sensors, and is in electronic communication with the control PCB 300, via a full-level sensor signal line 320.

The preferred sensor array is made from stainless steel and constitutes the only metal component in the chemical flow path excluding the selected pump 106. The valves, tubings and fittings used throughout the chemical pathway are preferably composed of Delrin ™ or Teflon ™ plastic so that contamination or chemical incompatibility problems are avoided.

The control PCB 300, in a manner to be described below, switches the chemical fluid bottle (either 332 or 340) that is used to supply the fluid 102 to the reservoir 310 and ultimately to the processing system 104. By switching bottles 332 or 340 in a timely manner, the processing system 104 is supplied with a continuous or uninterrupted supply of fluid 102, thereby eliminating the problems found in prior art feed chemical systems.

The control PCB 300 is in electronic communication with the full-level sensor 312 via the signal line 320, and the fill-level sensor 314, via the signal line 318. The PCB 300 is also in electronic communication with the time set device 205 (via signal line 202), the reset device 207 (via the signal line 204), the power supply device 209 (via signal line 206), and the alarm 213 (via signal line 208). In addition, the PCB 300 is in electronic communication with a vacuum source isolation solenoid 324, via a vacuum source isolation solenoid signal line 322. The solenoid 324 is mechanically connected to the isolation valve 323, via an actuation rod 325. Also, the PCB 300 is in electronic communication with a inert gas isolation solenoid 350, via a bottle 2 gas isolation solenoid signal line 348, and with a inert gas isolation solenoid 356, via a bottle 1 gas isolation solenoid signal line 354. The solenoid 350 is mechanically connected to the isolation valve 351, via an actuation rod 349; while the solenoid 356 is mechanically connected to the isolation valve 355, via an actuation rod 357.

Finally, the PCB 300 is in electronic communication with an operator display panel 360. The panel 360 receives input signals to illuminate a plurality of light emitting diodes (LED's) via a bottle #1 LED signal line 362, a bottle #2 LED signal line 364, a remote alarm LED signal line 368, and a vacuum source isolation solenoid LED signal line 366.

Figure 4:
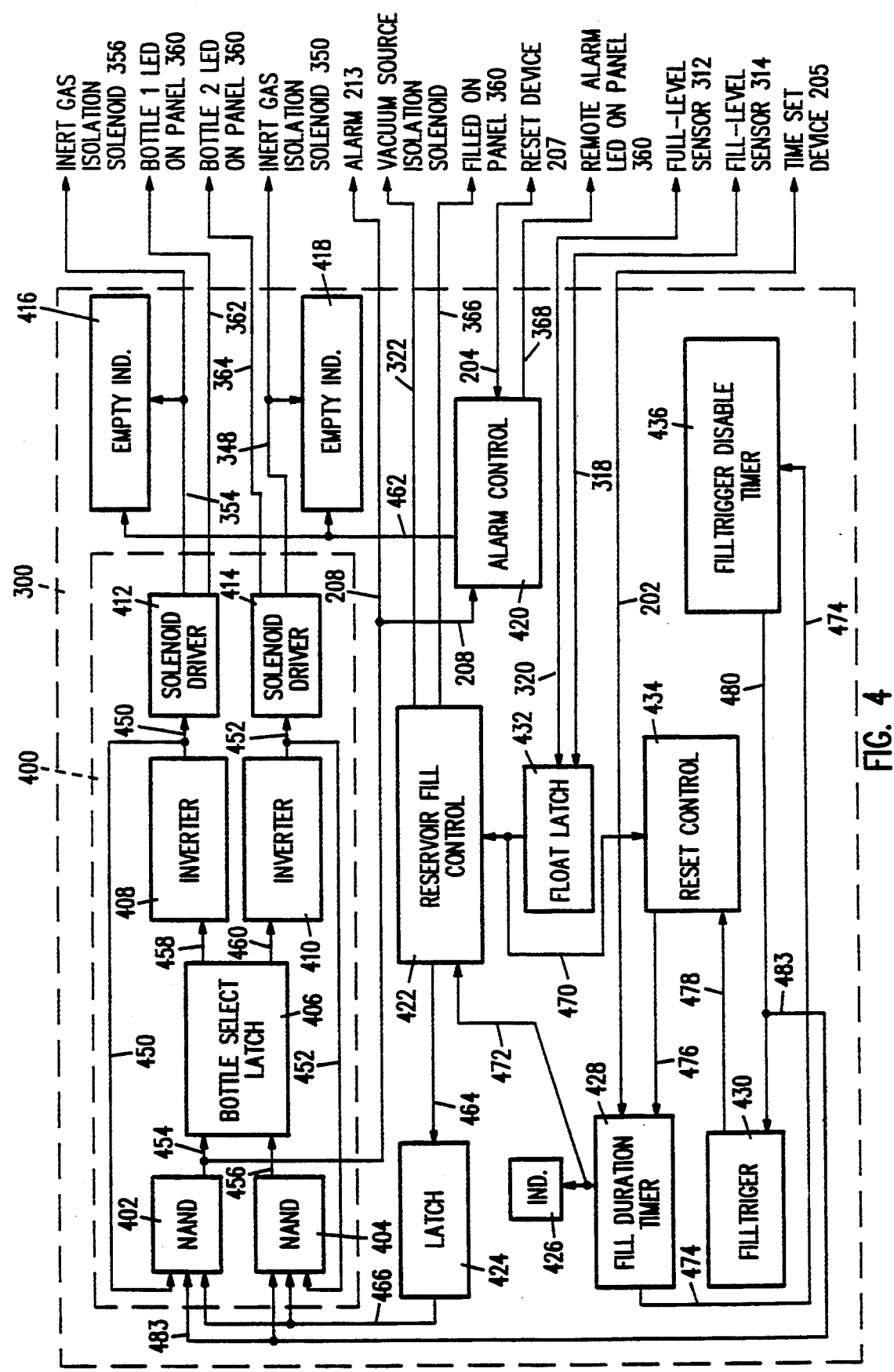
FIG. 4 is a block diagram schematically depicting a control PCB (i.e. item 302 of FIG. 3).

The control PCB 300 of FIG. 3 is depicted in a block diagram in FIG. 4. As shown, the control PCB 300 includes in operative interconnection a bottle active selector logic generally indicated at 400, a bottle #1 empty indicator 416, a bottle #2 empty indicator 418, an alarm control 420, a reservoir fill control 422, a float latch 432, a reset control 434, a fill trigger disable timer 436, a fill trigger 430, a fill duration timer 428, a fill duration indicator 426, and a bottle switch latch 424. The bottle active selector logic 400 is shown to further include in operative interconnection NAND gate 402, NAND gate 404, a bottle select latch 406, an inverter 408, an inverter 410, a bottle 1 gas isolation solenoid driver 412, and a bottle 2 gas isolation solenoid driver 414. The outputs of the control PCB 300 are as shown to the right hand side of FIG. 4, not shown, however, are the connections to the power supply and ground.

NAND gate 402 is in electronic communication with the inverter 408, the timer 436, the bottle switch latch 424, the bottle select latch 406, the alarm control 420 and the alarm 213 as shown. The gate 402 is responsive to signal input received from the inverter 408 via a bottle #1 active signal line 450, the timer 436 via a bottle switching inhibit signal line 483, the latch 424 via a full bottle switch inhibit signal line 466. The gate 402 generates an output to the latch 406 via a bottle #1 select signal line 454, to the control 420 via the alarm signal line 208, to the alarm 213 via the alarm signal line 208.

In similar fashion, as shown, the NAND gate 404 is in electronic communication with the latch 424, the timer 436, the inverter 410, and the latch 406. The NAND gate 404 is responsive to inputs from the latch 424 via signal line 466, the timer 436 via the signal line 483, the inverter 410 via a bottle #2 active signal line 452, and operative to generate an output to the latch 406 via a bottle 2 select signal line 456.

The bottle select latch 406 is communicatively coupled to the gates 402, 404, and the inverters 408, 410. Latch 406 receives inputs from the gate 402, via the signal line 454, and from the gate 404, via the signal line 456. The latch 406 is operative to generate an output to the inverter 408, via a bottle #1 select signal line 458, and to the inverter 410, via a bottle #2 select signal line 460.

The inverter 408 is communicatively coupled to the bottle select latch 406, the solenoid driver 412, and the gate 402. The inverter 408 receives input from the latch 406, via the signal line 458, and generates output to the driver 412 and the gate 402, via the signal line 450.

In similar fashion, the inverter 410 is shown electronically coupled to the latch 406, the driver 414, and the gate 404. The inverter 410 receives input from the latch 406, via the signal line 460, and generates an output to the gate 404 and the driver 414, via the signal line 452.

The driver 412 is electronically coupled to the inverter 408, the indicator 416, the inert gas isolation solenoid 356, and a bottle #1 LED (not shown) mounted on the panel 360. The driver 412 responds to input from the inverter 408, via the signal line 450, and generates an output to the solenoid 356 and the indicator 416, via the signal line 354, and also an output to the bottle #1 LED, via the signal line 362.

The driver 414 is communicatively coupled to the inverter 410, the inert gas isolation solenoid 350, and a bottle #2 LED (not shown) mounted on the operator panel 360. The driver 414 receives input from the inverter 410 via the signal line 452. The driver 414 outputs signals to the bottle #2 LED via the signal line 364, and to the solenoid valve 350 and the indicator 418, via the signal line 348.

The bottle switch latch 424 is communicatively coupled to the reservoir fill control 422, and the gates, 402, 404. The latch 424 receives input from the fill control 422 via a bottle switch signal line 464, and generates an output to the gates 402, 404 via a full bottle switch inhibit signal line 466.

The fill control 422 is communicatively coupled to the latch 424, the fill duration timer 428 the float latch 432, the vacuum source isolation solenoid 324, and a fill LED (not shown) mounted on the panel 360. The fill control 422 responds to input from the latch 432, via a fill reset signal line 470, and from the timer 428 via a fill duration signal line 472. The fill control 422 is operative to generate a signal to the latch 424 via the signal line 464, to the isolation solenoid 324 via the signal line 322, and to the fill LED via the signal line 366.

The alarm control 420 is communicatively coupled to the gate 402, the indicators 416 and 418, the reset device 207, a remote alarm LED (not shown) mounted on the panel 360. The alarm control 420 receives input from the gate 402 via the signal line 208, and from the reset device 207 via the reset signal line 204; the control 420 generates an output to the indicators 416 and 418 via a bottle empty indicator driver signal 462, and to the remote alarm LED via the signal line 368.

The float latch 432 is electronically coupled to the fill control 422, the reset control 434, the full level sensor 312, and the fill level sensor 314. The latch 432 receives input from the sensor 312 via the signal line 320, and from the sensor 314 via the signal line 318. The latch 432 generates an output to the fill control 422 and the reset control 434 via a fill reset signal line 470.

The reset control 434 is electronically coupled to the fill duration timer 428, the fill trigger 430, and the float latch 432. The control 434 receives input from the latch 432 via the signal line 470, and from the fill trigger 430 via a restart signal line 478. The reset control 434 generates an output to the timer 428 via a restart signal line 476.

The fill duration timer 428 is communicatively coupled to the fill duration indicator 426, the fill control 422, the reset control 434, the time set device 205, and the fill trigger disable timer 436. The timer 428 receives input from the reset control 434 via the signal line 476, and from the device 205 via the signal line 202. The timer 428 generates an output to both the fill control 422 and the indicator 426, via the signal line 472, and to the disable timer 436 via a fill duration exceeded trigger signal line 474.

The disable timer 436 is electronically coupled to the fill trigger 430, and the fill duration timer 428. The disable timer 436 receives input from the timer 428 via the signal line 474. Timer 436 generates an output to the trigger 430 via a time output signal line 480.

Fill trigger 430 is communicatively coupled to the disable timer 436, the reset control 434, the gate 402. The trigger 430 receives input from the gate 402 via the signal line 483, and from the disable timer 436 via the signal line 480. The trigger 430 generates an output to the reset control 434 via the restart signal line 478.

Figure 5A:
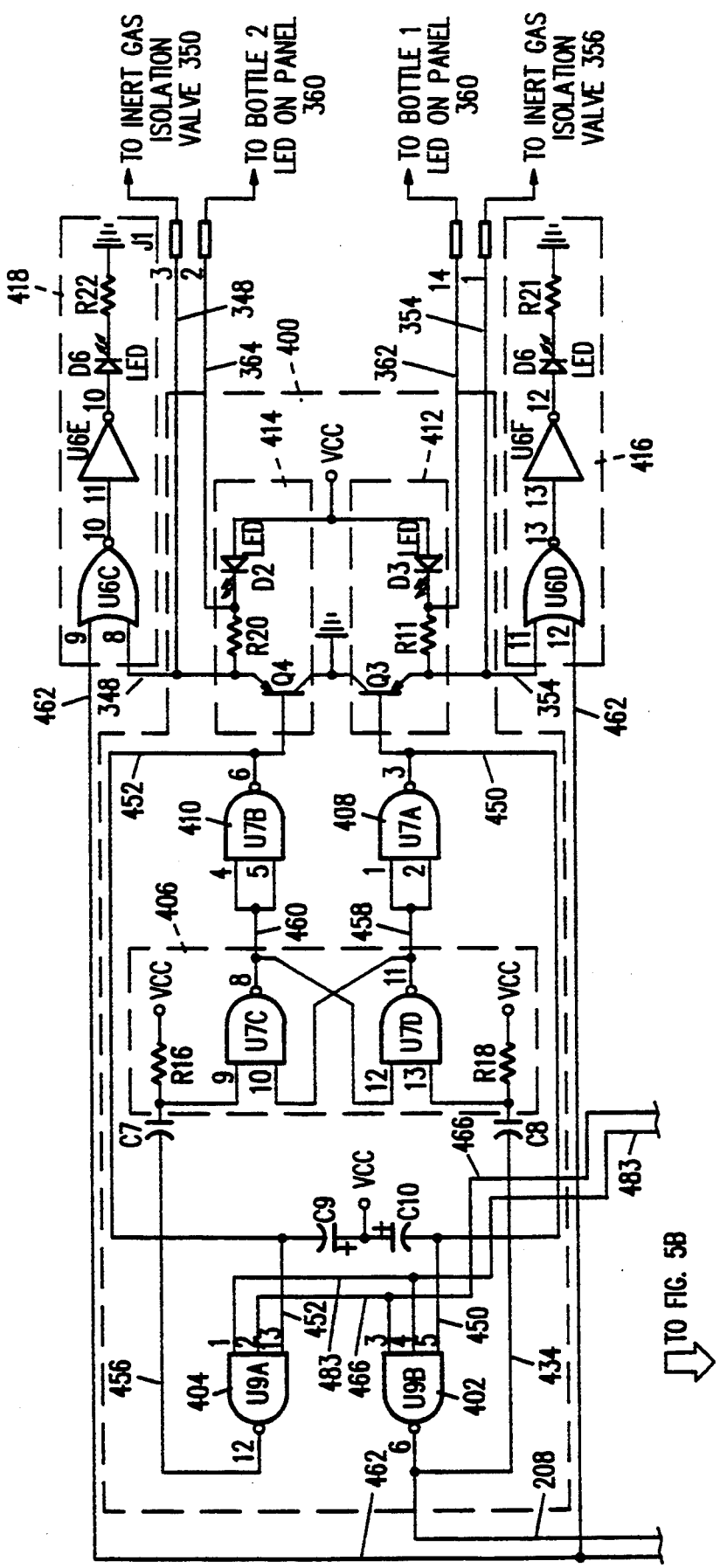
FIGS. 5A–5B show a two part circuit diagram illustrating the best mode enablement of the control PCB depicted in FIG. 4.
Figure 5B:
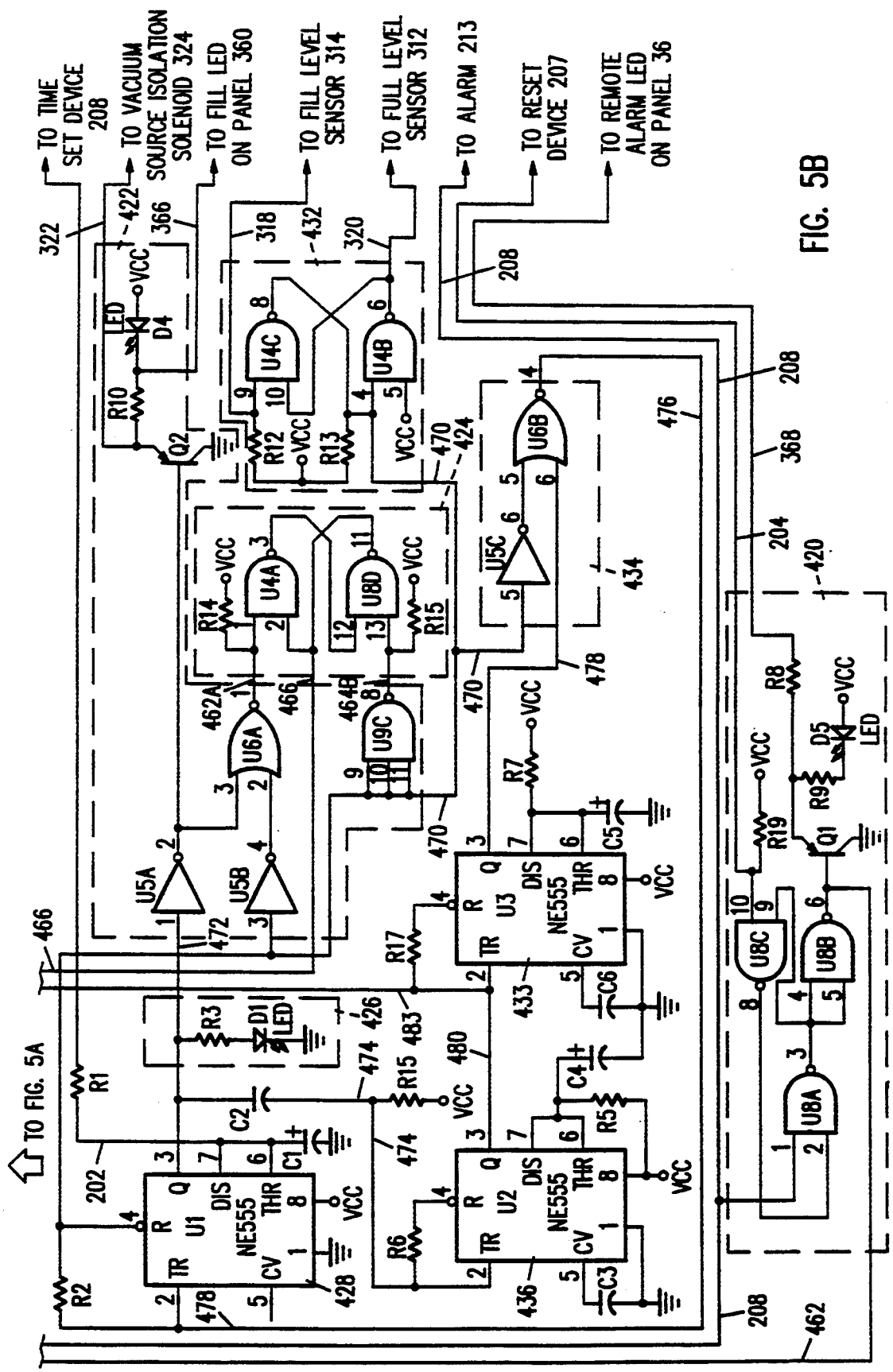

FIGS. 5A-5B illustrate a circuit diagram depicting the best mode enablement of the control PCB 300 of FIG. 4. It should be noted that individual devices have been collected into the functional groupings identified in FIG. 4. Thus, the circuit diagram illustrated in FIGS. 5A-5B includes the following functional groups: The timer 436, the reset control 434, the fill trigger 430, the fill duration timer 428, the fill duration indicator 426, the float latch 432, the reservoir fill control 422, the latch 424, the alarm control 420, the NAND gate 402, the NAND gate 404, the latch 406, the inverter 408, the inverter 410, the driver 412, the driver 414, the bottle 1 empty indicator 416, and the bottle #2 empty indicator 418.

The timer 436 includes a timer device U2 with the signal line 474 as an input and the signal line 480 as an output.

The reset control 434 includes an inverter U5C and a two-input NOR gate U6B. The inputs to the control 434 include the signal line 470 and the signal line 478; the output from control 434 is the signal line 476.

The trigger 430 includes a timer device U3 and has as input the signal line 480 and as output the signal line 478.

The timer 428 includes a timer device U1 and has as inputs a signal line 202, and a signal line 476; the signal line 474 is output from the timer U1.

The fill duration indicator 426 includes a light emitting dial (LED) device D1 and has an input signal line 472.

The fill control 422 includes an inverter device U5A, an inverter device U5B, a two-input NOR gate device U6A, a three-input NAND gate device U9C, a transistor device Q2, and a LED device D4. The fill control 422 has two inputs. The signal line 472, and the signal line 470; the control 422 has four outputs, a signal line 464A, a signal line 464B, the signal line 322, and the signal line 366.

The latch 424 includes a two-input NAND gate device U4C, and a two-input NAND gate device U4B. The input to the latch 424 are the signal lines 464A and 464B; the output from the latch 424 is the signal line 466.

The alarm control 420 includes a two-input NAND gate device U8A, a two-input NAND gate device U8B, a two-input NAND gate device U8C, a transistor device Q1, and a LED device D5. The alarm control has two inputs, the signal line 204 and the signal line 208; the control 420 has one output, the signal line 368.

The NAND gate 402 is a three-input NAND gate device U9B. The input signal lines include the signal line 450, the signal line 483, and the signal line 466. The output line is the signal line 454.

Similarly, the NAND gate 404 is a three-input NAND gate device U9A. The input signal lines include the signal line 452, the signal line 466, and the signal line 483. The output from the gate 404 is the signal line 456.

The latch 406 includes a two-input NAND gate device U7C, and a two-input NAND gate device U7B.

The latch 406 has as input the signal line 454, and the signal line 456; the outputs are the signal line 458, and the signal line 460.

The inverter 408 is a two-input NAND gate device U7A and has as input the signal line 458, and as output the signal line 450. The inverter 410 is a two-input NAND gate device U7B. The inverter 410 has as input the signal line 460, and as output the signal line 452.

The driver 412 includes a transistor device Q3, and a LED D3. The inputs to the driver 412 is the signal line 450; the output from the driver 412 are the signal line 354, and the signal line 362. The driver 414 includes a transistor device Q4, and a LED D2. The signal line 452 is input to the driver 414; the signal lines 348 and 364 are outputs from the driver 414.

The indicator 416 includes a two-input NOR gate device U6E, an inverter U5E, and a LED D5. The indicator 418 includes a two-input NOR gate device U6E, an inverter device U5E, and a LED D5. There are two-inputs to the indicator 418, the signal line 348, and the signal line 462. The indicator 416 receives two-inputs, the signal line 354, and the signal line 462.

Figure 6:
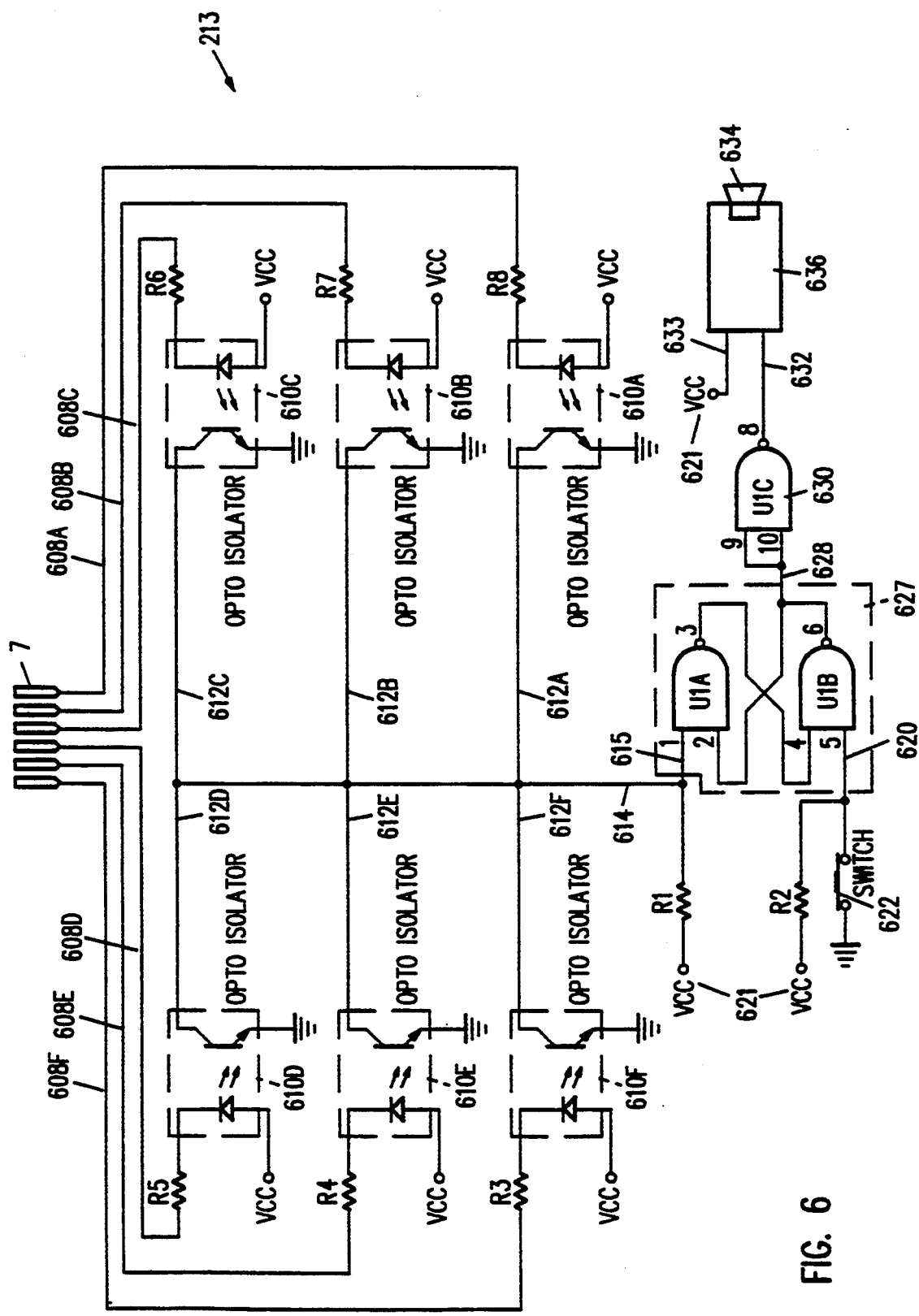
FIG. 6 is a circuit diagram illustrating the best mode enablement of a remote alarm (i.e., item 213 of FIG. 2).

FIG. 6 illustrates a circuit diagram of alarm 213, wherein the alarm 213 is communicatively coupled to the gate 402 via a connector 7. The alarm 213 includes in electrically operative combination an opto-isolator 610A, a reset switch 622, and alarm latch 627, an inverter 630, a speaker control 636, and a speaker 634. The opto-isolator 610A serves to isolate the alarm control 420, the NAND gate 402, and the latch 406 from the speaker 634 and the speaker control 636. It should be noted that as many as twelve opto-isolators may be utilized although only six have been shown in FIG. 6. The opto-isolator is communicatively coupled via an alarm signal line 608A to the connector 7. The opto-isolator 610A is also communicatively coupled, via a latch set signal line 614 to the alarm latch 627. The alarm latch 627 includes a two input NAND gate device U1A, and a two input NAND gate device U1B. Device U1A is communicatively coupled to a power source 621 via the signal line 614; while device U1B is coupled to the power source 621 and the reset switch 622 via a latch reset signal line 620. The latch 627 is coupled to the inverter 630 via a latch output signal line 628. The inverter is communicatively coupled to the speaker control 636 via an inverter output signal line 632. A speaker source is communicatively coupled to the power source 621 via a speaker power signal line 633.

In operation (referring to FIGS. 5A and 5B), the switching sequence (i.e., switching from an empty bottle of chemical to a full bottle) begins with the NAND gates 402 and 404. The three inputs to the two gates are:
1) The input from bottle one or bottle two active (via signal lines 450 or 452) wherein an "active" signal input is equal to a high;
2) The input from fill trigger disable timer 436 (via signal line 483). Fill trigger disable timer 436 is approximately 2 seconds in duration and prevents the immediate bottle switch at the expiration of time 428. Input from fill trigger disable timer 436 is low while timing.
3) This input is from the latch 424 to prevent a bottle change when the reservoir is full.

These three inputs control the bottle switching and it takes all three inputs in an active state (i.e., high) to cause the output to go low, which is required to make the bottle switch occur. This will happen on only one of the two NAND gates 402, 404 at a time.

The outputs of NAND gates 402,404 (i.e., signal lines 454, 456 respectively) are the inputs to the bottle select latch 406 which allows only one bottle to be active at any given time.

The selected inverter for the active bottle (that is, either inverter 408 or inverter 410) inverts the output signals of the bottle select latch 406 thereby setting the correct base drive voltage polarity for the selected solenoid driver transistor (i.e., Q4 or Q3 shown on FIG. 5A).

The selected solenoid driver 414 (or 412) energizes solenoids 350 (or 356) and permits inert gas, stored in container 215 (or 217) to pass through supply pipe 212, 352 (or 214 and 358) thereby actuating the bottle 2 isolation solenoid 342 (or the bottle 1 isolation solenoid 334). This actuation of the solenoid 342 (or 334) opens the isolation valve 341 (or 333) thereby allowing chemical fluid contained in bottle #2, 340 (or bottle #1, 332) to pass into the reservoir 310 and ultimately to the processing system 104.

The reservoir fill control 422 is activated when the fill-level sensor 314 indicates that the fluid 102 has been depleted and the reservoir 310 needs to be filled. The float latch 432 is set by the fill-level sensor 314 and remains latched until reset by the full-level sensor 312. When reset by full-level sensor 312, the float latch 432 supplies a trigger signal, via signal lines 470 and via reset control 434 and signal line 476, to start fill duration timer 428.

Fill duration timer 428 times the duration of the filling of the reservoir. In the present example, the reservoir 310 must be filled within approximately seven minutes. If the full-level sensor 320 is activated prior to the expiration of the seven-minute timer, then the fill duration timer 428 is locked out by a low signal from the float latch 432 and a bottle switch would not occur. If the seven-minute time duration of fill duration timer 428 does expire, a trigger from timer 428 via signal line 474 would start the fill trigger disable timer 436. After a two-second period of time, fill trigger disable timer 436 stops and fill trigger 430 starts. The duration of fill trigger 430 is approximately 0.7 seconds and is used as a switch-over trigger for the bottle switching (i.e., as an input to the gates 402 and 404) and the restart trigger for fill duration timer 428 (via reset control 434). If the full-level sensor 312 is not set during the time period for fill duration timer 428, it is assumed that the active bottle is empty and the standby bottle becomes the active bottle.

The latch 424 is for enabling or disabling a bottle switch. The latch 424 will not allow any signal from the full-level sensor 312 and fill-level 314 after the initial activation. This eliminates random switching.

The alarm circuitry is incorporated to provide indications of a bottle switch so that empty bottles can be changed in a timely fashion. The alarm control 420 only drives the LED's mounted on the panel 360 and should not be confused with the remote alarm circuit (illustrated in FIG. 6) which provides an alarm preferably audible at a remote location. The LED's on panel 360 provide an indication of the switcher status. When a bottle switch occurs, the alarm LED bottle is illuminated; the LED for bottle 1 or 2, depending on which bottle is considered empty, is also illuminated. This alarm condition can only be reset from the reset device 207 (FIG. 3) mounted on the panel 360. The remote alarm 213 (FIG. 3) is also reset by the device 207. In an effort to minimize errors the alarm must be addressed at the resist switching unit so that the empty bottle is replaced before the alarm is reset.

In normal operation there is no alarm condition. The state of the alarm signal line 208 is normally high or in the "1" state. Consequently, the state of the signal lines 608A, 612A, 614, 615, and 620 are all in the high or "1" state. Under alarm conditions, the state of the signal line 208 changes to a low or "0" state. Thus, the state of the signal lines 608A, 612A, and 614, all move to a correspondingly low or "0" state. The state of the signal line 615 goes to a low state causing the state to change in the signal line 628 to a low or "0" state. The state of the signal line 632 is correspondingly changed to a high or "1" state thereby causing the speaker control 636 to pass power via the signal line 633 to the speaker 634 thereby causing an audible alarm sound. To reset or silence the audible alarm, the reset switch 622 is closed. In the closed position, power passes through the switch 622 to ground thereby causing the state of the signal line 620 to go from a previously high state to a low state. This state change on the reset signal line 620 causes the state of the signal line 628 to change from a low to a high state. This causes the state of the inverter output signal line 632 to go to a low state thereby causing the speaker control 634 to isolate power from the speaker 634 thereby silencing the audible alarm.

Although a preferred embodiment of the present invention has been disclosed above, it will be appreciated that numerous alterations and modifications thereof will be apparent to those skilled in the art after having read the above disclosures. It is therefore intended that the following claims be interpreted as covering all such alterations and modifications as fall within the true spirit and scope of the invention.

What is claimed is:

1. A switching unit for selectively switching between a plurality of source bottles, each containing a supply of chemical fluid, to provide an uninterrupted flow of chemical fluid to a process tool in a vacuum draw continuous feed chemical system comprising in operative combination:

a) a closed reservoir disposed in a fluid path, downstream of a plurality of source bottles for holding a predetermined amount of chemical fluid drawn thereinto from said source bottles by vacuum, said reservoir having a plurality of fluid inlet ports each disposed communicatively coupled with a supply line associated with each of said bottles for draw of chemical from each of said supply bottles to said reservoir by vacuum;

b) a plurality of bottle selector valve means each of which are associated with individual ones of said chemical fluid bottle supply lines, said bottle selector valve means having two operational modes including:

i) a first active mode for permitting fluid flow from an associated chemical fluid supply bottle to said reservoir; and ii) a second nonactive mode for preventing fluid flow from an associated chemical fluid supply bottle to said reservoir;

c) sensor means for monitoring the fluid level within said reservoir; and d) electronic control means communicatively coupled with each of said valve means for selectively enabling the mode operation of each of said valve means to switch the active status of an empty bottle to nonactive and the nonactive status of a full standby bottle to active in response to signal information received from said reservoir fluid level sensor means.

2. A fluid source bottle switching unit as in claim 1 which further includes:
   a) vacuum means connected to a gas outlet port of said reservoir and operative to generate a negative pressure within said reservoir sufficient to draw chemical fluid from an active chemical fluid bottle and
   b) said reservoir fluid level sensor means is a float level sensor array including a first full-level sensor, a second fill-level sensor and a third empty-level sensor wherein:
      i) activation of said full-level sensor disables said vacuum means such that chemical fluid no longer flows from said active first bottle;
      ii) activation of said fill-level sensor re-enables said vacuum means and signals an alarm condition to said control means to selectively operate said valve means for source bottle switching operation from said first chemical fluid bottle to said second standby alternate chemical fluid bottle; and
      iii) activation of said empty-level sensor disables all of said chemical fluid bottle valve means and said vacuum means and provides an interlock signal to said process tool to stop continued processing.

3. A fluid source bottle switching unit as in claim 2 which includes:
   a) a time set device for providing a variable time base adjustment for the bottle switching operation of said electronic control means to accommodate a variety of fluid viscosities;
   b) an alarm responsive to said alarm condition for signaling to an operator that a current fluid source bottle is empty and needs replacement; and
   c) a reset device for providing a clear alarm signal to said control means which generates a reset restart signal to indicate when said empty bottle has been replaced by a full bottle.

4. A fluid source bottle switching unit as in claim 3 wherein said control means includes:
   a) a float latch responsive to signals received from said full-level and fill-level sensors and operative to generate a fill reset signal;
   b) reset control logic responsive to said fill reset signal and said reset restart signal and operative to generate a reset signal;
   c) a fill duration timer responsive to said time set device and said reset signal and operative to generate a fill duration signal, a switching inhibit signal, and a reset restart signal;
   d) reservoir fill control logic responsive to said fill reset signal and said fill duration signal and operative to generate a bottle switch signal and a reservoir fill signal;
   e) a switch latch responsive to said bottle switch signal and operative to generate a bottle switch inhibit signal;
   f) a switcher responsive to said bottle switch signal and said bottle switch inhibit signal and operative to generate said first bottle switch signal, a said second bottle switch signal, and a bottle empty alarm signal; and
   g) alarm control logic for monitoring said alarm condition and responsive to said bottle empty alarm signal and operative to generate an alarm signal.

5. A fluid source bottle switching unit as in claim 4 wherein said switching unit is enclosed within a sealable, explosion-proof cabinet and wherein said cabinet includes:
   a) means for extinguishing flames generated by combustion of said chemical fluid; and
   b) means for exhausting combustible gases generated by said chemical fluid to an outside exhaust plenum.

6. A fluid source bottle switching unit as in claim 5 which includes a panel display means mounted to an outside surface of said cabinet for display of alarm and other system information.

7. A fluid source bottle switching unit as in claim 1 wherein each of said bottle selector valve means include an inert gas activated solenoid valve.

* * * * *